United States Patent
Inoue et al.

(10) Patent No.: US 12,528,755 B2
(45) Date of Patent: Jan. 20, 2026

(54) METHOD OF PRODUCING BIO-DERIVED BRANCHED ALKYL GLYCERYL ETHER, AND BIO-DERIVED BRANCHED ALKYL GLYCERYL ETHER PRODUCED BY SAID METHOD

(71) Applicant: ADEKA CORPORATION, Tokyo (JP)

(72) Inventors: Takahiro Inoue, Tokyo (JP); Masahiro Takata, Tokyo (JP); Toshio Hamasaki, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 18/871,701

(22) PCT Filed: Oct. 2, 2023

(86) PCT No.: PCT/JP2023/035861
§ 371 (c)(1),
(2) Date: Dec. 4, 2024

(87) PCT Pub. No.: WO2024/075678
PCT Pub. Date: Apr. 11, 2024

(65) Prior Publication Data
US 2025/0263362 A1    Aug. 21, 2025

(30) Foreign Application Priority Data
Oct. 7, 2022    (JP) ................. 2022-162316

(51) Int. Cl.
*C07C 41/09*    (2006.01)

(52) U.S. Cl.
CPC .................... *C07C 41/09* (2013.01)

(58) Field of Classification Search
CPC ..................................... C07C 41/09
USPC ......................................... 568/672
See application file for complete search history.

(56) References Cited

U.S. PATENT DOCUMENTS

| | | | |
|---|---|---|---|
| 5,736,574 A | 4/1998 | Burnier et al. | |
| 2015/0166457 A1 | 6/2015 | Klabunde et al. | |
| 2021/0353515 A1 | 11/2021 | Tsushima et al. | |

FOREIGN PATENT DOCUMENTS

| | | |
|---|---|---|
| CN | 104402682 | 3/2015 |
| JP | 51-76424 | 7/1976 |
| JP | 52-12109 | 1/1977 |
| JP | 8-310947 | 11/1996 |
| JP | 2000-212114 | 8/2000 |
| JP | 2007-84464 | 4/2007 |
| JP | 2015-522572 | 8/2015 |
| JP | 2021-59497 | 4/2021 |
| JP | 2002-163692 | 10/2022 |
| WO | 2017/110493 | 6/2017 |
| WO | 2020/066893 | 4/2020 |
| WO | 2020/116534 | 6/2020 |
| WO | 2021/237207 | 11/2021 |

OTHER PUBLICATIONS

JP2007084464a, 2007;—machine translation.*
Zhanwei Xu et al., "Electronic and steric factors for enhanced selective synthesis of 2-ethyl-1-hexanol in the Ir—complex-catalyzed Guerbet reaction of 1-butanol", ScienceDirect, Chinese Journal of Catalysis, vol. 42, 2021, pp. 1586-1592.
International Search Report issued Dec. 26, 2023 in International Application No. PCT/JP2023/035861, with English translation.
Gabriels, Dries et al., Review of catalytic systems and thermodynamics for the Guerbet condensation reaction and challenges for biomass valorization, Catalysis Science & Technology, 2015, vol. 5, No. 8, pp. 3876-3902.
Matsu-Ura, Toyomi et al., "Guerbet Reaction of Primary Alcohols Leading to β-Alkylated Dimer Alcohols Catalyzed by Iridium Complexes", The Journal of Organic Chemistry, Sep. 21, 2006, vol. 71, No. 21, pp. 8306-8308.
Communication issued under Rule 114(2) EPC on Oct. 22, 2025 in European Patent Application No. 23874805.7.
Communication from the EPO issued Oct. 31, 2025 in European Patent Application No. 23 874 805.7.
Miller, Robert, et al., "Producing 2-Ethylhexanol . . . by the Guerbet Reaction," Engineering Chemistry, Jan. 1, 1961, vol. 53, No. 1, pp. 33-36.

* cited by examiner

*Primary Examiner* — Ana Z Muresan
(74) *Attorney, Agent, or Firm* — Wenderoth, Lind & Ponack, L.L.P.

(57) ABSTRACT

The present invention relates to a method of producing a bio-derived branched alkyl glyceryl ether, including: a step of providing a bio-derived branched primary alcohol having a branched alkyl group having 6 to 12 carbon atoms, the step including dimerizing one kind or two or more kinds selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms; and a step of producing a bio-derived branched alkyl glyceryl ether by using the resultant bio-derived branched primary alcohol, and a bio-derived branched alkyl glyceryl ether obtained by the production method.

8 Claims, No Drawings

METHOD OF PRODUCING BIO-DERIVED BRANCHED ALKYL GLYCERYL ETHER, AND BIO-DERIVED BRANCHED ALKYL GLYCERYL ETHER PRODUCED BY SAID METHOD

TECHNICAL FIELD

The present invention relates to a method of producing a bio-derived branched alkyl glyceryl ether, which can provide a bio-derived branched alkyl glyceryl ether with suppressed odor by using a bio-derived raw material.

BACKGROUND ART

In a cosmetic, a detergent, and the like, antimicrobial agents are generally used for the purpose of, for example, preservation. It is known that, among them, alkyl glyceryl ethers are used as compounds each having high safety for a human body (e.g., Patent Documents 1 and 2).

However, it is known that such alkyl glyceryl ethers, depending on their structure and method of production, may each generate an unpleasant odor and undergo oxidative deterioration and decomposition over time during storage. As a countermeasure against the foregoing, Patent Document 3, for example, describes a method of preparing a glyceryl ether-containing composition that can maintain its quality over a long period of time.

In addition, in recent years, there has been a demand in the field of chemicals in general, including cosmetic ingredients, for some or all of the raw materials to be used in production to be bio-derived, for example, for reasons of environmental friendliness. In response to this trend, there has been a demand in the market for the development of a method to prepare a glyceryl ether-containing composition that can maintain its quality over a long period of time using a simple method and a bio-derived raw material.

CITATION LIST

Patent Document

[Patent Document 1] JP 51-076424 A
[Patent Document 2] JP 08-310947 A
[Patent Document 3] WO 2020/066893 A1

SUMMARY OF INVENTION

Technical Problem

An object of the present invention is to provide a method of producing a bio-derived branched alkyl glyceryl ether, which can provide a bio-derived branched alkyl glyceryl ether with suppressed odor while using a bio-derived raw material.

Solution to Problem

In view of the foregoing, the inventors of the present invention have made intensive investigations, and have completed the present invention. That is, according to one embodiment of the present invention, there is provided a method of producing a bio-derived branched alkyl glyceryl ether, comprising: a step of providing a bio-derived branched primary alcohol having a branched alkyl group having 6 to 12 carbon atoms, the step including dimerizing one kind or two or more kinds selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms; and a step of producing a bio-derived branched alkyl glyceryl ether by using the resultant bio-derived branched primary alcohol.

Advantageous Effects of Invention

The present invention can provide the method of producing a bio-derived branched alkyl glyceryl ether, which can provide a bio-derived branched alkyl glyceryl ether with suppressed odor by using a bio-derived raw material.

DESCRIPTION OF EMBODIMENTS

A bio-derived linear primary alcohol to be used in the present invention refers to one kind or two or more kinds selected from the group consisting of: a bio-derived linear primary alcohol having a linear alkyl group having 3 to 6 carbon atoms; and a bio-derived linear primary alcohol having a linear alkenyl group having 3 to 6 carbon atoms, which are obtained from plant resources or the like. Examples thereof include: a primary alcohol obtained by subjecting a plant oil, such as palm oil, palm kernel oil, soybean oil, rapeseed oil, castor oil, olive oil, cottonseed oil, coconut oil, corn oil, safflower oil, sesame oil, sunflower oil, camellia oil, or linseed oil, to refining and/or separation treatment; a primary alcohol obtained by subjecting biomass derived from corn, sugar cane, sugar beet, banana, wheat, barley, rye, potato, sweet potato, cassava, taro, fava beans, lentils, or peas to fermentation and/or metabolism with a microorganism; and a primary alcohol obtained by synthesis using, as a raw material, any of various bio-derived compounds each obtained from a plant resource or the like, such as palm oil, palm kernel oil, soybean oil, rapeseed oil, castor oil, olive oil, cottonseed oil, coconut oil, corn oil, safflower oil, sesame oil, sunflower oil, camellia oil, or linseed oil.

There is no particular limitation on a method of providing the bio-derived linear primary alcohol having a linear alkyl group having 3 to 6 carbon atoms or the bio-derived linear primary alcohol having a linear alkenyl group having 3 to 6 carbon atoms by subjecting the above plant oil to refining and/or separation treatment, and a known method may be used. For example, a method of producing the bio-derived linear primary alcohol from a fatty acid obtained by hydrolyzing a fatty acid glyceride in a plant oil may be used. In this case, a known method may be used as the method of producing the bio-derived linear primary alcohol having a linear alkyl group having 3 to 6 carbon atoms or the bio-derived linear primary alcohol having a linear alkenyl group having 3 to 6 carbon atoms from the fatty acid. For example, a method involving methyl-esterifying the fatty acid, followed by hydrogenation, or a method involving directly hydrogenating the fatty acid may be used.

In addition, there is no particular limitation on a method of providing the bio-derived linear primary alcohol having a linear alkyl group having 3 to 6 carbon atoms or the bio-derived linear primary alcohol having a linear alkenyl group having 3 to 6 carbon atoms by subjecting the above biomass to fermentation with a microorganism, and a known method may be used. For example, a method involving subjecting a sugar such as cellulose obtained from the biomass to fermentation and/or metabolism with a microorganism, such as a microbe, an enzyme, or yeast, having a fermentation and/or metabolism ability under the environment of an appropriate temperature, humidity, and atmosphere may be used.

In addition, there is no particular limitation on a method of providing the bio-derived linear primary alcohol having a linear alkyl group having 3 to 6 carbon atoms or the bio-derived linear primary alcohol having a linear alkenyl group having 3 to 6 carbon atoms by synthesis using, as a raw material, any of various bio-derived compounds obtained from the above plant resource or the like, and a known method may be used. In this case, a bio-derived linear primary alcohol having a hydrocarbon group having the same number of carbon atoms as that of the bio-derived compound to be used as the raw material may be produced, or a bio-derived linear primary alcohol having a hydrocarbon group having the number of carbon atoms different from that of the bio-derived compound to be used as the raw material may be produced. Examples of such method include: a method involving hydrogenating a bio-derived linear aldehyde having a linear alkyl group having 3 to 6 carbon atoms or a bio-derived linear aldehyde having a linear alkenyl group having 3 to 6 carbon atoms by a known method; and a method involving oxidizing or dehydrogenating a bio-derived alcohol, such as ethanol or propanol, by a known method to provide an aldehyde compound, and then condensing and hydrogenating the resultant aldehyde compound.

There is no particular limitation on the bio-derived linear primary alcohol having a linear alkyl group having 3 to 6 carbon atoms to be used in the present invention as long as the alcohol is a bio-derived linear primary alcohol having 3 to 6 carbon atoms and having a linear alkyl group and a hydroxy group in a molecule thereof. Specific examples thereof include bio-derived n-propanol (1-propanol), bio-derived n-butanol (1-butanol), bio-derived n-pentanol (1-pentanol), and bio-derived n-hexanol (1-hexanol). There is no particular limitation on the bio-derived linear primary alcohol having a linear alkenyl group having 3 to 6 carbon atoms as long as the alcohol is a bio-derived linear primary alcohol having 3 to 6 carbon atoms and having a linear alkenyl group and a hydroxy group in a molecule thereof. Specific examples thereof include bio-derived n-propenyl alcohol (allyl alcohol), bio-derived n-butenyl alcohol (crotyl alcohol), bio-derived n-pentenyl alcohol, and bio-derived n-hexenyl alcohol. Among them, bio-derived n-butanol (1-butanol) is preferably used as the bio-derived linear primary alcohol from the viewpoint of providing a bio-derived branched alkyl glyceryl ether with further suppressed odor. Those bio-derived linear primary alcohols may be used without any particular limitation as long as the alcohols are obtained from plant resources or the like by known methods.

A bio-derived linear aldehyde to be used in the present invention refers to one kind or two or more kinds selected from the group consisting of: a bio-derived linear aldehyde having a linear alkyl group having 3 to 6 carbon atoms; and a bio-derived linear aldehyde having a linear alkenyl group having 3 to 6 carbon atoms, which are obtained from plant resources or the like. Examples thereof include: an aldehyde obtained by subjecting biomass derived from corn, sugar cane, sugar beet, banana, wheat, barley, rye, potato, sweet potato, cassava, taro, fava beans, lentils, or peas to fermentation and/or metabolism with a microorganism; and an aldehyde obtained by synthesis using, as a raw material, any of various bio-derived compounds including a bio-derived linear primary alcohol obtained from a plant resource or the like, such as palm oil, palm kernel oil, soybean oil, rapeseed oil, castor oil, olive oil, cottonseed oil, coconut oil, corn oil, safflower oil, sesame oil, sunflower oil, camellia oil, or linseed oil.

There is no particular limitation on a method of providing a bio-derived linear aldehyde having a linear alkyl group having 3 to 6 carbon atoms or a bio-derived linear aldehyde having a linear alkenyl group having 3 to 6 carbon atoms by subjecting the above biomass to fermentation with a microorganism, and a known method may be used. For example, a method involving subjecting a sugar such as cellulose obtained from biomass to fermentation and/or metabolism with a microorganism, such as a microbe, an enzyme, or yeast, having a fermentation and/or metabolism ability under the environment of an appropriate temperature, humidity, and atmosphere may be used.

In addition, there is no particular limitation on a method of providing a bio-derived linear aldehyde having a linear alkyl group having 3 to 6 carbon atoms or a bio-derived linear aldehyde having a linear alkenyl group having 3 to 6 carbon atoms by synthesis using, as a raw material, any of various bio-derived compounds including a bio-derived linear primary alcohol obtained from the above plant resource or the like, and a known method may be used. In this case, a bio-derived linear aldehyde having a hydrocarbon group having the same number of carbon atoms as that of the bio-derived compound to be used as the raw material may be produced, or a bio-derived linear aldehyde having a hydrocarbon group having the number of carbon atoms different from that of the bio-derived compound to be used as the raw material may be produced so as to be used in the present invention. Examples of such method include: a method involving oxidizing or dehydrogenating a bio-derived linear primary alcohol having a linear alkyl group having 3 to 6 carbon atoms or a bio-derived linear primary alcohol having a linear alkenyl group having 3 to 6 carbon atoms by a known method; a method involving performing hydroformylation by an oxo method using an olefin having 2 to 5 carbon atoms, carbon monoxide, and hydrogen to produce an aldehyde having an increased number of carbon atoms; and a method involving condensing an aldehyde having 2 to 4 carbon atoms, which is obtained by oxidizing or dehydrogenating a bio-derived alcohol, such as ethanol or propanol, by a known method, to produce an aldehyde having an increased number of carbon atoms. In the present invention, among them, a bio-derived linear aldehyde obtained by oxidizing or dehydrogenating a bio-derived linear primary alcohol having a linear alkyl group having 3 to 6 carbon atoms or a bio-derived linear primary alcohol having a linear alkenyl group having 3 to 6 carbon atoms by a known method is preferably used as the bio-derived linear aldehyde from the viewpoint of providing a bio-derived branched alkyl glyceryl ether with further suppressed odor.

There is no particular limitation on the bio-derived linear aldehyde having a linear alkyl group having 3 to 6 carbon atoms to be used in the present invention as long as the aldehyde is a bio-derived linear aldehyde having 3 to 6 carbon atoms and having a linear alkyl group and an aldehyde group in a molecule thereof. Specific examples thereof include bio-derived n-propionaldehyde (propanal), bio-derived n-butyraldehyde (butanal), bio-derived n-valeraldehyde (pentanal), and bio-derived n-hexylaldehyde (hexanal). There is no particular limitation on the bio-derived linear aldehyde having a linear alkenyl group having 3 to 6 carbon atoms as long as the aldehyde is a bio-derived linear aldehyde having 3 to 6 carbon atoms having a linear alkenyl group and an aldehyde group in a molecule thereof.

Specific examples thereof include bio-derived n-propenaldehyde (propenal, acrolein), bio-derived n-butenaldehyde (butenal, crotonaldehyde), bio-derived n-pentenaldehyde (pentenal), and bio-derived n-hexenaldehyde (hexanal). Among them, bio-derived n-butyraldehyde (butanal) is preferably used as the bio-derived linear aldehyde from the viewpoint of providing a bio-derived branched alkyl glyceryl ether with further suppressed odor. Those bio-derived linear aldehydes may be used without any particular limitation as long as the aldehydes are obtained from plant resources or the like by known methods. For example, when bio-derived n-butyraldehyde is used as the bio-derived linear aldehyde having a linear alkyl group having 3 to 6 carbon atoms, bio-derived n-butyraldehyde obtained by oxidizing or dehydrogenating bio-butanol by a known method, or bio-derived n-butyraldehyde obtained by subjecting bio-propylene to hydroformylation by an oxo method may be used. In the present invention, bio-derived n-butyraldehyde obtained by oxidizing or dehydrogenating bio-derived n-butanol by a known method is particularly preferably used as the bio-derived linear aldehyde from the viewpoint of providing a bio-derived branched alkyl glyceryl ether with particularly suppressed odor.

A known method may be used as a method of dimerizing one kind or two or more kinds selected from the group consisting of: the bio-derived linear primary alcohol having a linear alkyl group having 3 to 6 carbon atoms; the bio-derived linear primary alcohol having a linear alkenyl group having 3 to 6 carbon atoms; the bio-derived linear aldehyde having a linear alkyl group having 3 to 6 carbon atoms; and the bio-derived linear aldehyde having a linear alkenyl group having 3 to 6 carbon atoms. For example, a method of dimerizing an alcohol described in Catal. Sci. Technol., 2015, vol. 5, p. 3876-3902, or a method of dimerizing an aldehyde described in JP 09-124536 A may be used. Specifically, there may be used a method of dimerizing the bio-derived linear primary alcohols each having a linear alkyl group having 3 to 6 carbon atoms, the bio-derived linear primary alcohols each having a linear alkenyl group having 3 to 6 carbon atoms, the bio-derived linear aldehydes each having a linear alkyl group having 3 to 6 carbon atoms, or the bio-derived linear aldehydes each having a linear alkenyl group having 3 to 6 carbon atoms through a reaction at from 60° C. to 320° C. in the presence of a catalyst or a basic compound as required. In addition, in the present invention, there may be used a method of dimerizing the bio-derived linear primary alcohols each having a linear alkyl group having 3 to 6 carbon atoms, the bio-derived linear primary alcohols each having a linear alkenyl group having 3 to 6 carbon atoms, the bio-derived linear aldehydes each having a linear alkyl group having 3 to 6 carbon atoms, or the bio-derived linear aldehydes each having a linear alkenyl group having 3 to 6 carbon atoms through a reaction under the above conditions in a system in which two or more kinds selected from the group consisting of: the bio-derived linear primary alcohol having a linear alkyl group having 3 to 6 carbon atoms; the bio-derived linear primary alcohol having a linear alkenyl group having 3 to 6 carbon atoms; the bio-derived linear aldehyde having a linear alkyl group having 3 to 6 carbon atoms; and the bio-derived linear aldehyde having a linear alkenyl group having 3 to 6 carbon atoms are mixed. In this case, the reaction may be performed in a reaction vessel under a reduced or pressurized state.

A known catalyst may be used as the catalyst that may be used in the dimerization of the bio-derived linear primary alcohol or the bio-derived linear aldehyde. Examples thereof include: a metal catalyst, such as metal powder, a metal oxide, a metal complex, a metal salt, or a metal alkoxide of copper, silver, zinc, nickel, palladium, platinum, cobalt, rhodium, iridium, iron, ruthenium, manganese, chromium, or molybdenum; and a nitroxyl radical-based catalyst such as 2,2,6,6-tetramethylpiperidine-1-oxyl (TEMPO). One kind or two or more kinds of those catalysts may be used. In addition, when the metal catalyst is used, a compound that serves as a ligand may be used in combination. Examples of such ligand include: an olefin ligand, such as ethylene, norbornene, norbornadiene, 1,7-octadiene, 1,5-cyclooctadiene, or pentamethylcyclopentadienyl; a phosphine ligand, such as ethylenebis(diphenylphosphine), cyclohexyldiphenylphosphine, dicyclohexylphenylphosphine, tri-t-butylphosphine, or triphenylphosphine; and a nitrogen-containing ligand, such as triethylamine, benzylamine, bipyridyl, bisiminopyridine, or imidazole. One kind or two or more kinds of those ligands may be used.

Examples of the basic compound that may be used in used in the dimerization of the bio-derived linear primary alcohol or the bio-derived linear aldehyde include: an oxide, a hydroxide, a carbonate, a carboxylate, a phosphate, an amine salt, and an alkoxide compound of an alkali metal, such as lithium, sodium, or potassium; and an oxide, a hydroxide, a carbonate, a carboxylate, a phosphate, an amine salt, and an alkoxide compound of an alkaline earth metal, such as magnesium or calcium. One kind or two or more kinds of those basic compounds may be used. In addition, those catalysts may each be used by being supported on zeolite, silica, alumina zirconia, magnesia, activated carbon, graphite, a carbon nanotube, or the like.

In addition, a solvent may be used as required in the dimerization of the bio-derived linear primary alcohol or the bio-derived linear aldehyde. Examples of such solvent include water, pentane, hexane, heptane, octane, decane, dodecane, benzene, toluene, xylene, ethylbenzene, dodecylbenzene, diethylene glycol dimethyl ether, triethylene glycol dimethyl ether, diphenyl ether, dibenzyl ether, diallyl ether, tetrahydrofuran, dioxane, N-methyl-2-pyrrolidone, ethyl butyrate, butyl butyrate, ethyl acetate, butyl acetate, dimethylformamide, N,N-dimethylacetamide, acetonitrile, propionitrile, and benzonitrile. One kind or two or more kinds of those solvents may be used.

When only the bio-derived linear primary alcohol is used as a raw material, it is only required that the step of providing a bio-derived branched primary alcohol having a branched alkyl group having 6 to 12 carbon atoms in the present invention comprise the step of dimerizing the bio-derived linear primary alcohol. The above step may consist of the step of dimerizing the bio-derived linear primary alcohol, or may comprise another step as required. For example, when the bio-derived linear primary alcohols each having a linear alkenyl group having 3 to 6 carbon atoms are dimerized as the bio-derived linear primary alcohols to provide a bio-derived branched primary alcohol having a branched alkyl group having 6 to 12 carbon atoms, a hydrogenation step is performed before or after the dimerization step.

In addition, when a raw material containing the bio-derived linear aldehyde is used, it is only required that the above step comprise the step of dimerizing the bio-derived linear aldehyde and the step of hydrogenating the resultant compound. The above step may consist of the step of dimerizing the bio-derived linear aldehyde and the step of hydrogenating the resultant compound, or may comprise another step as required.

In the present invention, through the above steps, bio-derived 2-methylpentanol in the case of using bio-derived n-propanol or bio-derived n-propenyl alcohol as the bio-derived linear primary alcohol, bio-derived 2-ethylhexanol in the case of using bio-derived n-butanol or bio-derived n-butenyl alcohol as the bio-derived linear primary alcohol, bio-derived 2-propylheptanol in the case of using bio-derived n-pentanol or bio-derived n-pentenyl alcohol as the bio-derived linear primary alcohol, and bio-derived 2-butyloctanol in the case of using bio-derived n-hexanol or bio-derived n-hexenyl alcohol as the bio-derived linear primary alcohol may each be produced as a bio-derived branched primary alcohol having a branched alkyl group having 6 to 12 carbon atoms that can simply produce a bio-derived branched alkyl glyceryl ether with suppressed odor.

In addition, similarly, through the above steps, bio-derived 2-methylpentanol in the case of using bio-derived n-propionaldehyde or bio-derived n-propenaldehyde as the bio-derived linear aldehyde, bio-derived 2-ethylhexanol in the case of using bio-derived n-butyraldehyde or bio-derived n-butenaldehyde as the bio-derived linear aldehyde, bio-derived 2-propylheptanol in the case of using bio-derived n-valeraldehyde or bio-derived n-pentenaldehyde as the bio-derived linear aldehyde, and bio-derived 2-butyloctanol in the case of using bio-derived n-hexylaldehyde or bio-derived n-hexenaldehyde as the bio-derived linear aldehyde may each be produced as a bio-derived branched primary alcohol having a branched alkyl group having 6 to 12 carbon atoms that can simply produce a bio-derived branched alkyl glyceryl ether with suppressed odor.

In the present invention, from the viewpoint of the suppression of an odor and various characteristics of a bio-derived branched alkyl glyceryl ether to be obtained, it is preferred to perform, as the step of providing a bio-derived branched primary alcohol, the step of dimerizing bio-derived n-butanol (1-butanol) to provide bio-derived 2-ethylhexanol, the step of dimerizing bio-derived n-butyraldehyde and further hydrogenating the resultant to provide bio-derived 2-ethylhexanol, or the step of dimerizing each of bio-derived n-butanol and bio-derived n-butyraldehyde, and hydrogenating bio-derived 2-ethylhexenal in the product to provide bio-derived 2-ethylhexanol.

The step of producing a bio-derived branched alkyl glyceryl ether in the present invention is a step of producing a bio-derived branched alkyl glyceryl ether by using the bio-derived branched primary alcohol obtained in the step described above. Examples of a method of producing the bio-derived branched alkyl glyceryl ether by using the bio-derived branched primary alcohol include: a method involving subjecting the bio-derived branched primary alcohol and glycerin to a dehydration condensation reaction; a method involving subjecting the bio-derived branched primary alcohol and 1-chloro-2,3-propanediol to a dehydrochlorination reaction; a method involving causing the bio-derived branched primary alcohol and epichlorohydrin to react with each other, and then subjecting the resultant glycidyl ether to hydrolysis; a method involving causing the bio-derived branched primary alcohol and glycidol to react with each other; and a method involving subjecting the bio-derived branched primary alcohol and allyl chloride to a dehydrochlorination reaction, then oxidizing the resultant with hydrogen peroxide, and subjecting the resultant glycidyl ether to hydrolysis. In each of those methods, the compound to be caused to react with the bio-derived branched primary alcohol may be a bio-derived compound obtained from a plant resource or the like or a compound derived from a petroleum raw material, but the bio-derived compound is preferably used from the viewpoint of environmental friendliness. In the present invention, among them, the method involving causing the bio-derived branched primary alcohol and bio-derived epichlorohydrin to react with each other, and then subjecting the resultant glycidyl ether to hydrolysis is preferably used.

Here, the bio-derived epichlorohydrin that may be preferably used in the present invention refers to epichlorohydrin produced from a plant resource or the like, and is, for example, bio-derived epichlorohydrin produced by using, as a raw material, a plant oil, such as soybean oil, rapeseed oil, or palm kernel oil, or biomass derived from corn, sugarcane, sugar beet, wheat, barley, or rye. A known method may be used as a method of producing such bio-derived epichlorohydrin without any particular limitation. An example thereof is a method involving producing bio-derived dichloropropanol by using a glycerin fatty acid ester in a plant oil, such as soybean oil, rapeseed oil, or palm kernel oil, or a glycerin fatty acid ester produced from biomass derived from corn, sugarcane, sugar beet, wheat, barley, or rye, and a chlorinating agent, followed by dehydrochlorination, to provide bio-derived epichlorohydrin. In addition, in the present invention, commercially available bio-derived epichlorohydrin such as Epicerol (trademark) manufactured by Solvay S.A. may be used.

The method involving causing the bio-derived branched primary alcohol and bio-derived epichlorohydrin to react with each other, and then subjecting the resultant glycidyl ether to hydrolysis, which may be preferably used as the method of producing a bio-derived branched alkyl glyceryl ether of the present invention, is more specifically a method including: a hydrination step of causing the bio-derived branched primary alcohol and bio-derived epichlorohydrin to react with each other to provide a hydrinated product; a ring-closing step of to ring-closing the resultant hydrinated product by a ring-closing reaction to provide a ring-closed product; and a ring-opening step of ring-opening the resultant ring-closed product by a ring-opening reaction to provide a bio-derived branched alkyl glyceryl ether. In the present invention, by using the method comprising such steps, a bio-derived branched alkyl glyceryl ether with suppressed odor can be produced by a simple method using a bio-derived raw material.

A ratio between the usage amounts of the bio-derived branched primary alcohol and bio-derived epichlorohydrin in the hydrination step of causing the bio-derived branched primary alcohol and bio-derived epichlorohydrin to react with each other to provide a hydrinated product is not particularly limited. However, from the viewpoint of a suppressing effect on an odor of a bio-derived branched alkyl glyceryl ether to be obtained, the ratio between the usage amounts of the bio-derived branched primary alcohol and the bio-derived epichlorohydrin is preferably from 1.0: 0.1 to 1.0:1.2, more preferably from 1.0:0.2 to 1.0:1.0, still more preferably from 1:0.3 to 1:0.8 in terms of molar ratio. In addition, a method of causing the bio-derived branched primary alcohol and the bio-derived epichlorohydrin to react with each other in the hydrination step is not particularly limited, and is, for example, a method involving mixing the bio-derived branched primary alcohol and the bio-derived epichlorohydrin, and subjecting the mixture to a reaction at from 20° C. to 150° C. for from 1 minute to 24 hours while performing heating and cooling as required. In addition, a known catalyst may be used in the hydrination step.

The ring-closing step of ring-closing the hydrinated product obtained in the hydrination step by a ring-closing reaction to provide a ring-closed product is specifically a step of eliminating a chloro group from the hydrinated product obtained in the hydrination step to form an epoxy group. A method of ring-closing the hydrinated product by the ring-closing reaction in the ring-closing step is not particularly limited, and for example, a method involving adding a known alkali agent to the hydrinated product to condense the hydrinated product may be used. In this case, for example, an alkali metal hydroxide, such as sodium hydroxide, potassium hydroxide, calcium hydroxide, or lithium hydroxide, and an aqueous solution thereof may each be used as the known alkali agent. When the known alkali agent is added to the hydrinated product to subject the hydrinated product to dehydration condensation, a ratio between the usage amounts of the hydrinated product and the alkali agent is not particularly limited, but from the viewpoint of a suppressing effect on an odor of a bio-derived branched alkyl glyceryl ether to be obtained, the ratio between the usage amounts of the hydrinated product and the alkali agent is preferably from 1:0.5 to 1:3, more preferably from 1:1 to 1:2 in terms of molar ratio. In addition, when the method of adding the known alkali agent to the hydrinated product to subject the hydrinated product to dehydration condensation is used, a specific method is not particularly limited, and is, for example, a method involving adding a known alkali agent aqueous solution to the hydrinated product, followed by mixing, and subjecting the mixture to a reaction at from 20° C. to 150° C. for from 1 minute to 24 hours while performing heating and cooling as required. In addition, a known catalyst may be used in the ring-closing reaction.

The ring-opening step of ring-opening the ring-closed product obtained in the ring-closing step by a ring-opening reaction to provide a bio-derived branched alkyl glyceryl ether is specifically a ring-opening step of ring-opening an epoxy group of the ring-closed product obtained in the ring-closing step by a ring-opening reaction to provide two hydroxy groups, to thereby provide a bio-derived branched alkyl glyceryl ether. A method of ring-opening the ring-closed product by the ring-opening reaction in the ring-opening step is not particularly limited, and for example, a method of ring-opening the ring-closed product by hydrolysis may be used. The method of ring-opening the ring-closed product by hydrolysis is not particularly limited, and is, for example, a method involving adding water to the ring-closed product, and subjecting the mixture to a reaction at from 20° C. to 200° C. for from 1 minute to 24 hours while performing heating or cooling under a reduced pressure or pressurized environment (0.01 kPa to 10 MPa) as required. In addition, a known catalyst may be used in the ring-opening reaction, and for example, an acid, such as sulfuric acid, hydrochloric acid, perchloric acid, phosphoric acid, acetic acid, or peracetic acid, may be used.

The method of producing a bio-derived branched alkyl glyceryl ether of the present invention may further comprise a distillation step of distilling a product by a known method in addition to the step of providing a bio-derived branched primary alcohol having a branched alkyl group having 6 to 12 carbon atoms, the step including dimerizing one kind or two or more kinds selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms, and the step of producing a bio-derived branched alkyl glyceryl ether by using the resultant bio-derived branched primary alcohol described above. In the present invention, examples of the distillation step include: a step of distilling a product containing the ring-closed product after the ring-closing step (intermediate distillation step); and a step of distilling a product containing the bio-derived branched alkyl glyceryl ether after the ring-opening step (final distillation). Any one of those steps may be performed, or both of the steps may be performed. In addition, a method of distilling the product is not particularly limited. For example, a method, such as atmospheric distillation, reduced-pressure distillation, molecular distillation, or hydrodistillation, may be used, and more specifically, a method, such as single distillation, fractional distillation, flash distillation, steam distillation, vacuum distillation, short-step distillation, thin film distillation, reactive distillation, or extractive distillation, may be used.

The method of producing a bio-derived branched alkyl glyceryl ether of the present invention may further comprise, after the ring-opening step, a deodorization step of deodorizing a product containing the bio-derived branched alkyl glyceryl ether. A method of deodorizing the product containing the bio-derived branched alkyl glyceryl ether is not particularly limited, and for example, a method involving bringing water, water vapor, or an inert gas into contact with the product containing the bio-derived branched alkyl glyceryl ether under normal pressure or reduced pressure may be used.

A bio-derived branched alkyl glyceryl ether of the present invention is a bio-derived branched alkyl glyceryl ether produced by the above method of producing a bio-derived branched alkyl glyceryl ether, including: a step of providing a bio-derived branched primary alcohol having a branched alkyl group having 6 to 12 carbon atoms, the step including dimerizing one kind or two or more kinds selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms; and a step of producing a bio-derived branched alkyl glyceryl ether by using the resultant bio-derived branched primary alcohol. In the respective steps in the present invention, the respective methods described above may be used. Further, the bio-derived branched alkyl glyceryl ether may be a bio-derived branched alkyl glyceryl ether produced by the above production method comprising the distillation step and/or the deodorization step.

Here, the bio-derived branched alkyl glyceryl ether of the present invention contains a small amount of inevitable impurities derived from the raw material. The branched alkyl glyceryl ether of the present invention may be distinguished from a branched alkyl glyceryl ether produced from a non-bio-derived raw material such as a petroleum raw material by specifying the inevitable impurities. However, the contained impurities vary depending on the kind of a plant or the like serving as a raw material, and hence the inevitable impurities cannot be uniformly specified. Thus, the bio-derived branched alkyl glyceryl ether of the present invention is specified by a production method limited in its raw material.

From the viewpoint of long-term quality stability, the bio-derived branched alkyl glyceryl ether of the present invention may be turned into a bio-derived branched alkyl glyceryl ether-containing composition including the bio-derived branched alkyl glyceryl ether and an antioxidant such as tocopherols in an amount of from 0.05 part by mass to 0.30 part by mass with respect to 100 parts by mass of the bio-derived branched alkyl glyceryl ether. For example, tocopherols, such as d-α-tocopherol, dl-α-tocopherol, and d-α-tocopherol acetate, and other known antioxidants may each be used as the antioxidant. However, from the viewpoint of further enhancing long-term quality stability, the tocopherols account for preferably 50 mass % or more and 100 mass % or less, more preferably 75 mass % or more and 100 mass % or less, particularly preferably 100 mass-(the antioxidant consists of the tocopherols) of the total amount of the antioxidant in the bio-derived branched alkyl glyceryl ether-containing composition.

A cosmetic composition or detergent composition of the present invention is a cosmetic composition or a detergent composition including the above bio-derived branched alkyl glyceryl ether. The blending amount of the bio-derived branched alkyl glyceryl ether in the cosmetic composition or detergent composition of the present invention is not particularly limited, but is preferably from 0.01 mass % to 20.0 mass %, more preferably from 0.05 mass % to 10.0 mass %, still more preferably from 0.10 mass %, to 5.0 mass % with respect to the total amount of the cosmetic composition or the detergent composition.

When the above bio-derived branched alkyl glyceryl ether is incorporated into the cosmetic composition or the detergent composition, the bio-derived branched alkyl glyceryl ether functions as an antimicrobial agent (preservative) for the composition. In addition, the bio-derived branched alkyl glyceryl ether of the present invention has an odor suppressed. Thus, even when the bio-derived branched alkyl glyceryl ether of the present invention is incorporated into the cosmetic composition or the detergent composition, the fragrance of the composition can be prevented from being adversely affected.

A specific usage mode of the cosmetic composition or detergent composition of the present invention is not particularly limited, and examples thereof include a shampoo, a hair rinse, a hair conditioner, a hair treatment, a skin lotion, a cosmetic liquid, a milky lotion, a cream, a face-washing foam, a cleansing milk, a cleansing lotion, a cleansing oil, a hair tonic, a hair styling liquid, a setting lotion, a hair bleach, a color rinse, a permanent wave solution, a lipstick, a facial mask, a foundation, eau de cologne, a sunscreen, a deodorant, a perfume, and a cosmetic oil.

Additives that are generally used in cosmetics or detergents in order to improve and modify various characteristics (e.g., solubility, dispersibility, stability, a feeling of use, applicability, permeability, moisture retention, safety, a design property, optical characteristics, fragrance, a whitening property) during storage, during use, and after use, depending on intended uses may each be blended into the cosmetic composition or detergent composition of the present invention. Examples of such additive include a higher alcohol, a powder component, a higher fatty acid, a moisturizing agent, a water-soluble polymer, a sequestering agent, a lower alcohol, water, a polyhydric alcohol, a monosaccharide, an oligosaccharide, a polysaccharide, an amino acid and a derivative thereof, an organic amine, a pH adjuster, a vitamin, a UV protection ingredient, an antioxidant, a thickener, a surfactant, and other blendable ingredients (e.g., a preservative, a blood circulation promoter, an antiphlogistic agent, an activator, a whitening agent, an antiseborrheic agent, an anti-inflammatory agent, various extracts, and plant and seaweed extracts). One kind or two or more kinds of those additives may be arbitrarily blended.

Examples of the higher alcohol include: linear higher alcohols, such as lauryl alcohol, cetyl alcohol, stearyl alcohol, behenyl alcohol, myristyl alcohol, oleyl alcohol, and cetostearyl alcohol; and branched higher alcohols, such as monostearyl glycerin ether (batyl alcohol), 2-decyltetradecinol, lanolin alcohol, cholesterol, phytosterol, hexyldodecanol, isostearyl alcohol, and octyldodecanol. One kind or two or more kinds of those higher alcohols may be used.

Examples of the powder component include: inorganic powders (e.g., talc, kaolin, mica, sericite, white mica, bronze mica, synthetic mica, lepidolite, black mica, vermiculite, magnesium carbonate, calcium carbonate, aluminum silicate, barium silicate, calcium silicate, magnesium silicate, strontium silicate, a metal salt of tungstic acid, magnesium, silica, zeolite, barium sulfate, calcined calcium sulfate (calcined gypsum), calcium phosphate, fluorine apatite, hydroxyapatite, ceramic powder, metal soap (e.g., zinc myristate, calcium palmitate, or aluminum stearate), and boron nitride); organic powders (e.g., polyamide resin powder (nylon powder), polyethylene powder, polymethyl methacrylate powder, polystyrene powder, copolymer resin powder of styrene and acrylic acid, benzoguanamine resin powder, polytetrafluoroethylene powder, and cellulose powder); inorganic white pigments (e.g., titanium dioxide and zinc oxide); inorganic red pigments (e.g., iron oxide (red iron oxide) and iron titanate); inorganic brown pigments (e.g., γ-iron oxide); inorganic yellow pigments (e.g., yellow iron oxide and yellow ocher); inorganic black pigments (e.g., black iron oxide and lower titanium oxide); inorganic purple pigments (e.g., manganese violet and cobalt violet); inorganic green pigments (e.g., chromium oxide, chromium hydroxide, and cobalt titanate); inorganic blue pigments (e.g., ultramarine blue and Prussian blue); pearl pigments (e.g., titanium oxide-coated mica, titanium oxide-coated bismuth oxychloride, titanium oxide-coated talc, colored titanium oxide-coated mica, bismuth oxychloride, and argentine); metal powder pigments (e.g., aluminum powder and copper powder); organic pigments, such as zirconium, barium, and aluminum lakes (e.g., organic pigments, such as Red No. 201, Red No. 202, Red No. 204, Red No. 205, Red No. 220, Red No. 226, Red No. 228, Red No. 405, Orange No. 203, Orange No. 204, Yellow No. 205, Yellow No. 401, and Blue No. 404, and Red No. 3, Red No. 104, Red No. 106, Red No. 227, Red No. 230, Red No. 401, Red No. 505, Orange No. 205, Yellow No. 4, Yellow No. 5, Yellow No. 202, Yellow No. 203, Green No. 3, and Blue No. 1); and natural colorants (e.g., chlorophyl and β-carotene). One kind or two or more kinds of those powder components may be used.

Examples of the higher fatty acid include lauric acid, myristic acid, palmitic acid, stearic acid, behenic acid, oleic acid, undecylenic acid, a tall oil fatty acid, isostearic acid, linoleic acid, linolenic acid, eicosapentaenoic acid (EPA), and docosahexaenoic acid (DHA). One kind or two or more kinds of those higher fatty acids may be used.

Examples of the moisturizing agent include polyethylene glycol, xylitol, sorbitol, maltitol, chondroitin sulfate, hyaluronic acid, mucoitin sulfate, charonin sulfate, atelocollagen, cholesteryl-12-hydroxystearate, sodium lactate, a bile acid salt, a dl-pyrrolidonecarboxylic acid salt, short-chain soluble collagen, a diglycerin (EO)PO adduct, a *Rosa roxburghii* extract, an *Achillea millefolium* extract, and a *Melilotus officinalis* extract. One kind or two or more kinds of those moisturizing agents may be used.

As a natural water-soluble polymer, there are given, for example: plant-based polymers (e.g., gum arabic, gum tragacanth, galactan, guar gum, carob gum, gum karaya, carrageenan, pectin, agar, a quince seed (*Pyrus cydonia*), algae colloid (brown alga extract), starch (rice, corn, potato, and wheat), and glycyrrhizic acid); microorganism-based polymers (e.g., xanthane gum, dextran, succinoglucan, pullulan, and gellan gum); and animal-based polymers (e.g., collagen, casein, albumin, and gelatin). One kind or two or more kinds of those natural water-soluble polymers may be used.

Examples of the water-soluble polymer include: starch-based polymers (e.g., carboxymethyl starch and methylhydroxypropyl starch); cellulose-based polymers (e.g., methylcellulose, ethylcellulose, methylhydroxypropylcellulose, hydroxyethylcellulose, sodium cellulose sulfate, hydroxypropylcellulose, carboxymethylcellulose, sodium carboxymethylcellulose, crystalline cellulose, and cellulose powder); alginic acid-based polymers (e.g., sodium alginate and alginic acid propylene glycol ester); vinyl-based polymers (e.g., polyvinyl alcohol, polyvinyl methyl ether, polyvinylpyrrolidone, and a carboxyvinyl polymer); polyoxyethylene-based polymers (e.g., a polyoxyethylene-polyoxypropylene copolymer obtained by using polyethylene glycol 20,000, 40,000, or 60,000 as a raw material); acrylic polymers (e.g., sodium polyacrylate, polyethyl acrylate, and polyacrylamide); polyethylene imine; and cationic polymers. One kind or two or more kinds of those water-soluble polymers may be used.

Examples of the sequestering agent include 1-hydroxyethane-1,1-diphosphonic acid, 1-hydroxyethane-1,1-diphosphonic acid tetrasodium salt, disodium edetate, trisodium edetate, tetrasodium edetate, sodium citrate, sodium polyphosphate, sodium metaphosphate, gluconic acid, phosphoric acid, citric acid, ascorbic acid, succinic acid, edetic acid, and trisodium ethylenediamine hydroxyethyl triacetate. One kind or two or more kinds of those sequestering agents may be used.

Examples of the lower alcohol include ethanol, propanol, isopropanol, isobutyl alcohol, and t-butyl alcohol. One kind or two or more kinds of those lower alcohols may be used.

Examples of the polyhydric alcohol include: dihydric alcohols (e.g., ethylene glycol, propylene glycol, 1,3-butylene glycol, and 1,2-hexanediol); trihydric alcohols (e.g., glycerin and trimethylolpropane); tetrahydric alcohols (e.g., pentaerythritol of 1,2,6-hexanetriol); pentahydric alcohols (e.g., xylitol); hexahydric alcohols (e.g., sorbitol and mannitol); polyhydric alcohol polymers (e.g., diethylene glycol, dipropylene glycol, triethylene glycol, polypropylene glycol, tetraethylene glycol, diglycerin, polyethylene glycol, triglycerin, tetraglycerin, and polyglycerin); dihydric alcohol alkyl ethers (e.g., ethylene glycol monomethyl ether, ethylene glycol monoethyl ether, ethylene glycol monobutyl ether, ethylene glycol monophenyl ether, ethylene glycol monohexyl ether, ethylene glycol mono-2-methylhexyl ether, ethylene glycol isoamyl ether, ethylene glycol benzyl ether, ethylene glycol isopropyl ether, ethylene glycol dimethyl ether, ethylene glycol diethyl ether, and ethylene glycol dibutyl ether); dihydric alcohol alkyl ethers (e.g., diethylene glycol monomethyl ether, diethylene glycol monoethyl ether, diethylene glycol monobutyl ether, diethylene glycol dimethyl ether, diethylene glycol diethyl ether, diethylene glycol butyl ether, diethylene glycol methyl ethyl ether, triethylene glycol monomethyl ether, triethylene glycol monoethyl ether, propylene glycol monomethyl ether, propylene glycol monoethyl ether, propylene glycol monobutyl ether, propylene glycol isopropyl ether, dipropylene glycol methyl ether, dipropylene glycol ethyl ether, and dipropylene glycol butyl ether); dihydric alcohol ether esters (e.g., ethylene glycol monomethyl ether acetate, ethylene glycol monoethyl ether acetate, ethylene glycol monobutyl ether acetate, ethylene glycol monophenyl ether acetate, ethylene glycol diadipate, ethylene glycol disuccinate, diethylene glycol monoethyl ether acetate, diethylene glycol monobutyl ether acetate, propylene glycol monomethyl ether acetate, propylene glycol monoethyl ether acetate, propylene glycol monopropyl ether acetate, and propylene glycol monophenyl ether acetate); sugar alcohols (e.g., sorbitol, maltitol, maltotriose, mannitol, sucrose, erythritol, glucose, fructose, amylolysis sugars, maltose, xylitose, and alcohols prepared by reduction of amylolysis sugars); Glysolid; tetrahydrofurfuryl alcohol; POE-tetrahydrofurfuryl alcohol; POP-butyl ether; POP/POE-butyl ether; tripolyoxypropylene glycerin ether; POP-glycerin ether; POP-glycerin ether phosphoric acid; POP/POE-pentaneerythritol ether; and polyglycerin. One kind or two or more kinds of those polyhydric alcohols may be used.

Examples of the monosaccharide include: trioses (e.g., D-glyceraldehyde and dihydroxyacetone); tetroses (e.g., D-erythrose, D-erythrulose, D-threose, and erythritol); pentoses (e.g., L-arabinose, D-xylose, L-lixose, D-arabinose, D-ribose, D-ribulose, D-xylulose, and L-xylulose); hexoses (e.g., D-glucose, D-talose, D-psicose, D-galactose, D-fructose, L-galactose, L-mannose, and D-tagatose); heptoses (e.g., aldoheptose and heptulose); octoses (e.g., octulose); deoxy sugars (e.g., 2-deoxy-D-ribose, 6-deoxy-L-galactose, and 6-deoxy-L-mannose); amino sugars (e.g., D-glucosamine, D-galactosamine, sialic acid, aminouronic acid, and muramic acid); and uronic acids (e.g., D-glucuronic acid, D-mannuronic acid, L-guluronic acid, D-galacturonic acid, and L-iduronic acid). One kind or two or more kinds of those monosaccharides may be used.

Examples of the oligosaccharide include sucrose, umbelliferose, lactose, planteose, isolychnoses, α,α-trehalose, raffinose, lychnoses, umbilicin, stachyose, and verbascose. One kind or two or more kinds of those oligosaccharides may be used.

Examples of the polysaccharide include cellulose, a quince seed, chondroitin sulfate, starch, galactan, dermatan sulfate, glycogen, gum arabic, heparan sulfate, hyaluronic acid, gum tragacanth, keratan sulfate, chondroitin, xanthane gum, mucoitin sulfate, guar gum, dextran, keratosulfate, locust bean gum, succinoglucan, and charonin sulfate. One kind or two or more kinds of those polysaccharides may be used.

Examples of the amino acid include: neutral amino acids (e.g., threonine and cysteine); and basic amino acids (e.g., hydroxylysine). In addition, examples of the amino acid derivative include acylsarcosine sodium (lauroylsarcosine sodium), acylglutamic acid salts, acyl R-alanine sodium, glutathione, and pyrrolidone carboxylic acid. One kind or two or more kinds of those amino acids may be used.

Examples of the organic amine include monoethanolamine, diethanolamine, triethanolamine, morpholine, triisopropanolamine, 2-amino-2-methyl-1,3-propanediol, and 2-amino-2-methyl-1-propanol. One kind or two or more kinds of those organic amines may be used.

Examples of the pH adjuster include buffers, such as lactic acid-sodium lactate, citric acid-sodium citrate, and succinic acid-sodium succinate. One kind or two or more kinds of those pH adjusters may be used.

Examples of the vitamin include vitamins A, B1, B2, B6, C, and E, and derivatives thereof, pantothenic acid and a derivative thereof, and biotin. One kind or two or more kinds of those vitamins may be used.

An inorganic UV protection ingredient, such as a powder pigment or a metal powder pigment, and a surface-treated product thereof, and an organic UV protection ingredient may each be used as the UV protection ingredient. Examples thereof include: metal oxides, such as titanium oxide, zinc oxide, cerium oxide, low-valence titanium oxide, and irondoped titanium oxide; metal hydroxides such as iron hydroxide; metal flakes, such as plate-like iron oxide and aluminum flakes; ceramics such as silicon carbide; and fluorine compound-treated, silicone-treated, silicone resin-treated, pendant-treated, silane coupling agent-treated, titanium coupling agent-treated, silane-treated, oil-treated, N-acylated lysine-treated, polyacrylic acid-treated, metal soap-treated, acrylic resin-treated, and metal oxide-treated products thereof; and salicylic acid-based, para-aminobenzoic acid-based, benzophenone-based, cinnamic acid-based, and benzoylmethane-based UV protection ingredients, 2-cyano-3,3-diphenylprop-2-enoic acid 2-ethylhexyl ester, 2-ethylhexyl dimethoxybenzylidene dioxoimidazolidinepropionate, 1-(3,4-dimethoxyphenyl)-4,4-dimethyl-1,3-pentanedione, cinoxate, methyl-O-aminobenzoate, 2-ethylhexyl-2-cyano-3,3-diphenylacrylate, 3-(4-methylbenzylidene)camphor, octyltriazone, 2-ethylhexyl 4-(3,4-dimethoxyphenylmethylene)-2,5-dioxo-1-imidazolidinepropionate, and polymer derivatives thereof. One kind or two or more kinds of those UV protection ingredients may be used.

Examples of the antioxidant include tocopherols, dibutylhydroxytoluene, butylhydroxyanisole, and gallic acid esters. One kind or two or more kinds of those antioxidants may be used.

Examples of the thickener include xanthan gum, carrageenan, high-methoxyl pectin, low-methoxyl pectin, guar gum, gum arabic, crystalline cellulose, arabinogalactan, karaya gum, gum tragacanth, alginic acid, albumin, casein, curdlan, β-glucan, a R-glucan derivative, gellan gum, dextran, α-glucose and an α-glucose derivative, cellulose or a derivative thereof, keratin and collagen or derivatives thereof, calcium alginate, pullulan, agar, gelatin, Tamarindus Indica seed polysaccharide, a carbomer, a dimethyldiallylammonium chloride/acrylamide copolymer, dimethyldiallylammounium chloride hectorite, an acrylamide/acrylic acid/dimethyldiallylammonium chloride copolymer, and dibutylethylhexanoyl glutamide. One kind or two or more kinds of those thickeners may be used.

Examples of the surfactant include: cationic surfactants (e.g., lauryltrimethylammonium chloride, cetyltrimethylammonium chloride, stearyltrimethylammonium chloride, an alkyltrimethylammonium chloride, distearyldimethylammonium chloride, stearyltrimethylammonium saccharin, cetyltrimethylammonium saccharin, behenyltrimethylammonium methylsulfate, behenyldimethylamine, behenic acid diethylaminoethylamide, behenic acid dimethylaminopropylamide, behenic acid dimethylaminoethylamide, stearyldimethylamine, palmitoxypropyldimethylamine, and stearoxypropyldimethylamine); anionic surfactants (e.g., an alkyl ether sulfuric acid salt, an alkyl sulfuric acid salt, an alkyl ether sulfuric acid ester salt, an alkenyl ether sulfuric acid salt, an alkenyl sulfuric acid salt, an olefin sulfonic acid salt, an alkane sulfonic acid salt, a saturated or unsaturated fatty acid salt, an alkyl or alkenyl ether carboxylic acid salt, an α-sulfone fatty acid salt, an N-acyl amino acid-type surfactant, a phosphoric acid mono- or diester-type surfactant, a sulfosuccinic acid ester, an N-alkyloyl methyl taurine salt, and derivatives thereof); amphoteric surfactants (e.g.: a betaine-type amphoteric surfactant, such as cocamidopropyldimethyl betaine acetate, lauryldimethylamino acid betaine, a 2-alkyl-N-carboxymethyl-N-hydroxymethyl imidazolinium betaine, lauryl hydroxy sulfobetaine, lauroyl amide ethyl hydroxyethyl carboxymethyl betaine, or a metal salt of hydroxypropyl phosphoric acid; an amino acid-type amphoteric surfactant such as a metal salt of R-laurylamino propionic acid; a sulfuric acid ester-type amphoteric surfactant; and a sulfonic acid-type amphoteric surfactant); and non-ionic surfactants (e.g., POE cetyl ether (ceteth), POE stearyl ether (steareth), POE behenyl ether, POE oleyl ether (oleth), POE lauryl ether (laureth), POE octyldodecyl ether, POE hexyldecyl ether, POE isostearyl ether, POE nonylphenyl ether, POE octylphenyl ether, POE polyoxypropylene cetyl ether, POE polyoxypropylene decyltetradecyl ether, POE sorbitan monooleate, POE sorbitan monostearate, POE sorbitan monopalmitate, POE sorbitan monolaurate, POE sorbitan trioleate, POE glycerin monostearate, POE glycerin monomyristate, POE sorbit tetraoleate, POE sorbit hexastearate, POE sorbit monolaurate, POE sorbit beeswax, polyethylene glycol monooleate, polyethylene glycol monostearate, polyethylene glycol monolaurate, lipophilic glycerin monooleate, lipophilic glycerin monostearate, self-emulsifiable glycerin monostearate, sorbitan monooleate, sorbitan sesquioleate, sorbitan trioleate, sorbitan monostearate, sorbitan monopalmitate, sorbitan monolaurate, a sucrose fatty acid ester, decaglyceryl monolaurate, decaglyceryl monostearate, decaglyceryl monooleate, decaglyceryl monomyristate, an alkyl glucoside, POE methyl glucoside, and POE methyl glucoside dioleate). One kind or two or more kinds of those surfactants may be used.

Examples of the other blendable ingredients include: preservatives (e.g., methylparaben, ethylparaben, butylparaben, and phenoxyethanol); antiphlogistic agents (e.g., a glycyrrhizic acid derivative, a glycyrrhetinic acid derivative, a salicylic acid derivative, hinokitiol, zinc oxide, and allantoin); whitening agents (e.g., a *Saxifraga sarmentosa* extract and arbutin); various extracts (e.g., *Phellodendron* bark, *Coptis japonica*, *Lithospermum erythrorhizon* root, *Paeonia lactiflora, Swertia japonica*, birch, sage, *Eriobotrya japonica*, carrot, aloe, mallow, iris, grape, coix seed, *Luffa cylindrica*, lily, saffron, *Cnidium officinale*, ginger, *Hypericum erectum, Ononis spinosa*, garlic, *capsicum*, *Citrus unshiu* peel, *Angelica acutiloba*, and seaweed extracts); activators (e.g., royal jelly, a photosensitive element, and a cholesterol derivative); blood circulation promoters (e.g., nicotinic acid benzyl ester, nicotinic acid β-butoxyethyl ester, capsaicin, zingerone, cantharides tincture, ichthammol, tannic acid, α-borneol, tocopherol nicotinate, inositol hexanicotinate, cyclandelate, cinnarizine, tolazoline, acetylcholine, verapamil, cepharanthine, and γ-orizanol); antiseborrheic agents (e.g., sulfur and thianthol); and anti-inflammatory agents (e.g., tranexamic acid, thiotaurine, and hypotaurine). One kind or two or more kinds of those other blendable ingredients may be used.

There is no particular limitation on the content at the time of addition of each of the higher alcohol, the powder component, the higher fatty acid, the moisturizing agent, the water-soluble polymer, the sequestering agent, the lower alcohol, the water, the polyhydric alcohol, the monosaccharide, the oligosaccharide, the polysaccharide, the amino acid and the derivative thereof, the organic amine, the pH adjuster, the vitamin, the UV protection ingredient, the antioxidant, the thickener, the surfactant, and the other blendable ingredients (e.g., the preservative, the blood circulation promoter, the antiphlogistic agent, the activator, the whitening agent, the antiseborrheic agent, the anti-inflammatory agent, the various extracts, and the plant and seaweed extracts) in the cosmetic composition or detergent composition of the present invention, and the content may be adjusted in accordance with embodiments and purposes. For example, each of the above additives may be added in an amount of from 0.001 mass % to 50.0 mass % with respect to the total mass of the cosmetic composition or the detergent composition.

EXAMPLES

The present invention is specifically described below by way of Examples. However, the present invention is by no means limited by these examples, and modifications may be made without departing from the scope of the present invention. In the following Examples and the like, the term "%" is by mass unless otherwise stated.

Example 1

3,552 g of bio-derived n-butanol, 424 g of tripotassium phosphate, 448 g of calcium oxide, and 160 g of a copper catalyst were loaded into an autoclave, and then the mixture was subjected to a reaction at 290° C. for 5 hours. The resultant was further filtered and distilled to provide 1,248 g of bio-derived 2-ethylhexanol that was a bio-derived branched primary alcohol in which the bio-derived n-butanol was dimerized, and 1,812 g of unreacted bio-derived n-butanol.

Then, 1,051 g of the resultant bio-derived 2-ethylhexanol and 3.5 g of anhydrous stannic chloride serving as a catalyst were loaded into another reaction vessel, and 249 g of bio-derived epichlorohydrin (Epicerol (trademark) manufactured by Solvay S.A.) was added thereto while a temperature in the reaction vessel was increased to 80° C. After that, the mixture was subjected to a reaction at 80° C. for 4 hours to provide 570 g of a hydrinated product. After that, unreacted bio-derived 2-ethylhexanol was removed by reducing a pressure in the reaction vessel to 2.0 kPa at 150° C. Then, 234 g of a 48% sodium hydroxide aqueous solution was added to the residue under normal pressure, and then the mixture was subjected to a reaction at 60° C. for 5 hours so that the hydrinated product was ring-closed by a ring-closing reaction. Thus, 429 g of a ring-closed product was obtained. Then, the resultant ring-closed product was distilled by reducing the pressure to 2.0 kPa at 130° C. Then, 585 g of water and 1.3 g of a 75% phosphoric acid aqueous solution were added thereto under normal pressure, and then the mixture was subjected to a reaction at 170° C. and 0.8 kPa so that the ring-closed product was ring-opened. Thus, 423 g of bio-derived 2-ethylhexyl glyceryl ether was obtained. Further, the resultant ether was distilled at from 160° C. to 210° C. and 1.0 kPa to provide a bio-derived 2-ethylhexyl glyceryl ether A.

Example 2

370.5 g of bio-derived n-butanol, 1.1 L of p-xylene, 39.8 g of a pentamethylcyclopentadienyliridium(III) dichloride dimer, 55.1 g of 1,7-octadiene, and 224.42 g of potassium tert-butoxide were loaded into an autoclave, and then the mixture was subjected to a reaction at 120° C. for 4 hours. The resultant was further filtered and distilled to provide 260 g of bio-derived 2-ethylhexanol that was a bio-derived branched primary alcohol in which the bio-derived n-butanol was dimerized.

Then, 250 g of the resultant bio-derived 2-ethylhexanol and 0.8 g of anhydrous stannic chloride serving as a catalyst were loaded into another reaction vessel, and 59.2 g of bio-derived epichlorohydrin (Epicerol (trademark) manufactured by Solvay S.A.) was added thereto while a temperature in the reaction vessel was increased to 80° C. After that, the mixture was subjected to a reaction at 80° C. for 4 hours to provide 135.6 g of a hydrinated product. After that, unreacted bio-derived 2-ethylhexanol was removed by reducing a pressure in the reaction vessel to 2.0 kPa at 150° C. Then, 55.7 g of a 485 sodium hydroxide aqueous solution was added to the residue under normal pressure, and then the mixture was subjected to a reaction at 60° C. for 5 hours so that the hydrinated product was ring-closed by a ring-closing reaction. Thus, 102.1 g of a ring-closed product was obtained. Then, the resultant ring-closed product was distilled by reducing the pressure to 2.0 kPa at 130° C. Then, 139.2 g of water and 0.3 g of a 75, phosphoric acid aqueous solution were added thereto under normal pressure, and then the mixture was subjected to a reaction at 170° C. and 0.8 kPa so that the ring-closed product was ring-opened. Thus, 100.6 g of bio-derived 2-ethylhexyl glyceryl ether was obtained. Further, the resultant ether was distilled at from 160° C. to 210° C. and 1.0 kPa to provide a bio-derived 2-ethylhexyl glyceryl ether B.

Example 3

3,100 g of bio-derived n-butanol, 398 g of copper(I) iodide, 327 g of TEMPO, 344 g of 1-methylimidazole, and 16 L of acetonitrile were loaded into an open-atmosphere reaction vessel, and then the mixture was subjected to a reaction at 25° C. for 24 hours. The resultant was further filtered and distilled to provide 2,100 g of bio-derived n-butyraldehyde. Then, 2,000 g of the resultant bio-derived n-butyraldehyde was mixed with 2 L of a 2 wt % sodium hydroxide aqueous solution, and the mixture was subjected to a reaction at 90° C. for 4 hours, followed by oil-water separation, to provide 1,720 g of an oil phase. The resultant oil phase was distilled to provide 1,400 g of bio-derived 2-ethylhexenal in which the bio-derived n-butyraldehyde was dimerized. Further, the resultant bio-derived 2-ethylhexenal was hydrogenated in the presence of a nickel-based catalyst at a temperature of 120° C. and a pressure of 4.0 MPa over 2 hours, followed by distillation, to provide 1,260 g of bio-derived 2-ethylhexanol that was a bio-derived branched primary alcohol.

Then, 1,051 g of the resultant bio-derived 2-ethylhexanol and 3.5 g of anhydrous stannic chloride serving as a catalyst were loaded into another reaction vessel, and 249 g of bio-derived epichlorohydrin (Epicerol (trademark) manufactured by Solvay S.A.) was added thereto while a temperature in the reaction vessel was increased to 80° C. After that, the mixture was subjected to a reaction at 80° C. for 4 hours to provide a hydrinated product. After that, unreacted bio-derived 2-ethylhexanol was removed by reducing a pressure in the reaction vessel to 2.0 kPa at 150° C. Then, 234 g of a 48% sodium hydroxide aqueous solution was added to the residue under normal pressure, and then the mixture was subjected to a reaction at 60° C. for 5 hours so that the hydrinated product was ring-closed by a ring-closing reaction. Thus, a ring-closed product was obtained. Then, the resultant ring-closed product was distilled by reducing the pressure to 2.0 kPa at 130° C. Then, 585 g of water and 1.3 g of a 75% phosphoric acid aqueous solution were added thereto under normal pressure, and then the mixture was subjected to a reaction at 170° C. and 0.8 kPa so that the ring-closed product was ring-opened. Thus, 423 g of bio-derived 2-ethylhexyl glyceryl ether was obtained. Further, the resultant ether was distilled at from 160° C. to 210° C. and 1.0 kPa to provide a bio-derived 2-ethylhexyl glyceryl ether C.

Comparative Example 1

A petroleum raw material-derived 2-ethylhexyl glyceryl ether D was obtained by the same method except that 1,051 g of petroleum raw material-derived 2-ethylhexanol produced through aldol condensation and hydrogenation of n-butyraldehyde after n-butyraldehyde was produced from propylene derived from a petroleum raw material by an oxo method was used instead of the bio-derived 2-ethylhexanol in Example 1.

<Evaluation of Deodorization Property>

The deodorization property immediately after production of the 2-ethylhexyl glyceryl ether produced in each of Examples 1 to 3 and Comparative Example 1 was evaluated. Specifically, seven examiners each checked the odor of the produced 2-ethylhexyl glyceryl ether and scored the product on a 10-point scale of from 1 to 10 points, with 10 points being completely odorless feeling (odor suppressed) and 1 point being strong odor feeling. The total score of the scoring results by the respective examiners was calculated, and the deodorization property was evaluated as follows: when the total score was 60 points or more, the evaluation was ◎; when the total score was 45 points or more and less than 60 points, the evaluation was ○; and when the total score was less than 45 points, the evaluation was x. The evaluation results are shown in Table 1.

TABLE 1

| | | Evaluation of deodorization property |
|---|---|---|
| Example 1 | Bio-derived 2-ethylhexyl glyceryl ether A | ◎ |
| Example 2 | Bio-derived 2-ethylhexyl glyceryl ether B | ◎ |
| Example 3 | Bio-derived 2-ethylhexyl glyceryl ether C | ◎ |
| Comparative Example 1 | Petroleum raw material-derived 2-ethylhexyl glyceryl ether D | x |

According to the present invention, a bio-derived branched alkyl glyceryl ether with suppressed odor can be obtained by using a bio-derived raw material.

The invention claimed is:

1. A method of producing a bio-derived branched alkyl glyceryl ether, comprising:
 a step of dimerizing a bio-derived compound to produce a bio-derived branched primary alcohol having a branched alkyl group having 6 to 12 carbon atoms, wherein the bio-derived compound is one or more selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms; and
 a step of reacting the bio-derived branched primary alcohol having a branched alkyl group having 6 to 12 carbon atoms to produce a bio-derived branched alkyl glyceryl ether.

2. The method of producing a bio-derived branched alkyl glyceryl ether according to claim 1, wherein the step of reacting the bio-derived branched primary alcohol having a branched alkyl group having 6 to 12 carbon atoms to produce the bio-derived branched alkyl glyceryl ether comprises:
 a hydrination step of reacting the bio-derived branched primary alcohol and bio-derived epichlorohydrin with each other to provide a hydrinated product;
 a ring-closing step of ring-closing the hydrinated product by a ring-closing reaction to provide a ring-closed product; and
 a ring-opening step of ring-opening the resultant ring-closed product by a ring-opening reaction to provide the bio-derived branched alkyl glyceryl ether.

3. The method of producing a bio-derived branched alkyl glyceryl ether according to claim 2, wherein the hydrination step comprises subjecting a mixture of the bio-derived branched primary alcohol and the bio-derived epichlorohydrin to a reaction at from 20° C. to 150° C. for from 1 minute to 24 hours while performing heating and/or cooling to provide the hydrinated product.

4. The method of producing a bio-derived branched alkyl glyceryl ether according to claim 2, wherein the ring-closing step comprises adding an alkali agent to the hydrinated product followed by mixing and allowing the reaction to proceed at from 20° C. to 150° C. for from 1 minute to 24 hours while performing heating and/or cooling to condense the hydrinated product thereby providing the ring-closed product.

5. The method of producing a bio-derived branched alkyl glyceryl ether according to claim 2, wherein the ring-opening step comprises adding water to the ring-closed product and subjecting the mixture to a reaction at from 20° C. to 200° C. for from 1 minute to 24 hours while performing heating and/or cooling under a reduced pressure or pressurized environment in the presence of a catalyst to produce the bio-derived branched alkyl glyceryl ether.

6. A method of producing a bio-derived branched alkyl glyceryl ether, comprising:
 a step of dimerizing a bio-derived compound in the presence of a catalyst or a basic compound at 60 to 320° C. to produce a bio-derived branched primary alcohol having a branched alkyl group having 6 to 12 carbon atoms, wherein the bio-derived compound is one or more selected from the group consisting of: a bio-derived linear primary alcohol having a linear alkyl group having 3 to 6 carbon atoms; a bio-derived linear primary alcohol having a linear alkenyl group having 3 to 6 carbon atoms; a bio-derived linear aldehyde having a linear alkyl group having 3 to 6 carbon atoms; and a bio-derived linear aldehyde having a linear alkenyl group having 3 to 6 carbon atoms; and
 a step of reacting the bio-derived branched primary alcohol having a branched alkyl group having 6 to 12 carbon atoms to produce a bio-derived branched alkyl glyceryl ether,
 wherein the step of reacting the bio-derived branched primary alcohol having a branched alkyl group having 6 to 12 carbon atoms to produce the bio-derived branched alkyl glyceryl ether comprises:
  a hydrination step comprising subjecting a mixture of the bio-derived branched primary alcohol and bio-derived epichlorohydrin to a reaction at from 20° C. to 150° C. for from 1 minute to 24 hours while performing heating and/or cooling to provide a hydrinated product,
  a ring-closing step of ring-closing the hydrinated product comprising adding an alkali agent to the hydrinated product followed by mixing and allowing the reaction to proceed at from 20° C. to 150° C. for from 1 minute to 24 hours while performing heating and/or cooling to condense the hydrinated product thereby providing a ring-closed product, and a ring-opening step of ring-opening the ring-closed product comprising adding water to the ring-closed product and subjecting the mixture to a reaction at from 20° C. to 200° C. for from 1 minute to 24 hours while performing heating and/or cooling under a reduced pressure or pressurized environment in the presence of a catalyst to produce the bio-derived branched alkyl glyceryl ether.

7. The method of producing a bio-derived branched alkyl glyceryl ether according to claim 1, wherein the step of dimerizing comprises dimerizing one or more selected from the group consisting of bio-derived n-butanol, bio-derived n-butenyl alcohol, bio-derived n-butyl aldehyde, and bio-derived n-butene aldehyde.

8. The method of producing a bio-derived branched alkyl glyceryl ether according to claim 6, wherein the step of dimerizing comprises dimerizing one or more selected from the group consisting of bio-derived n-butanol, bio-derived n-butenyl alcohol, bio-derived n-butyl aldehyde, and bio-derived n-butene aldehyde.

\* \* \* \* \*